March 21, 1950 G. H. SCHANZ 2,501,584
APPARATUS FOR FORMING ANNULAR TUBULAR BODIES
Filed May 22, 1948 3 Sheets-Sheet 1

Inventor
George H. Schanz
By
Atty.

March 21, 1950 G. H. SCHANZ 2,501,584
APPARATUS FOR FORMING ANNULAR TUBULAR BODIES
Filed May 22, 1948 3 Sheets-Sheet 3

Inventor
George H. Schanz
By
Atty

Patented Mar. 21, 1950

2,501,584

UNITED STATES PATENT OFFICE 2,501,584

APPARATUS FOR FORMING ANNULAR TUBULAR BODIES

George H. Schanz, Akron, Ohio, assignor to The B. F. Goodrich Company, New York, N. Y., a corporation of New York Application May 22, 1948, Serial No. 28,668

14 Claims. (Cl. 18—9)

1

This invention relates to an apparatus for the forming of annular tubular bodies of plastic material and is especially useful in the manufacture of inflatable tire tubes of rubber-like material, although features of the invention are also useful in forming annular bodies for other purposes and of other soft plastic material.

In the manufacture of inflatable inner tubes for pneumatic tires, the trend of tire design has been toward tires of smaller rim diameter and larger cross-sectional area, requiring similarly shaped tubes. Where it has been proposed to form such annular tubes merely by controlling the die of an extruding machine to cause the material to issue from the die at a higher speed at one position about the die than at another and thereby to cause bending of the tube as it was formed, it has been found difficult or impossible to regulate the curvature of the tube and to provide tubes of different sizes and curvatures with the same extruding equipment or to provide tubes of different compositions from the same die.

It is an object of the present invention to provide an apparatus to form the tubular material progressively to the desired bend after it has issued from an extruding die and before the material has completely cooled.

Other objects are to provide an apparatus for increasing the curvature of the tubular material progressively, to cool the material as it is formed, to work the material progressively by positively advancing the material by contact with opposite sides of the material and to accomplish forming of the material within a compact space requiring a minimum of floor space.

These and other objects will appear from the following description and the accompanying drawings.

Figure 1:
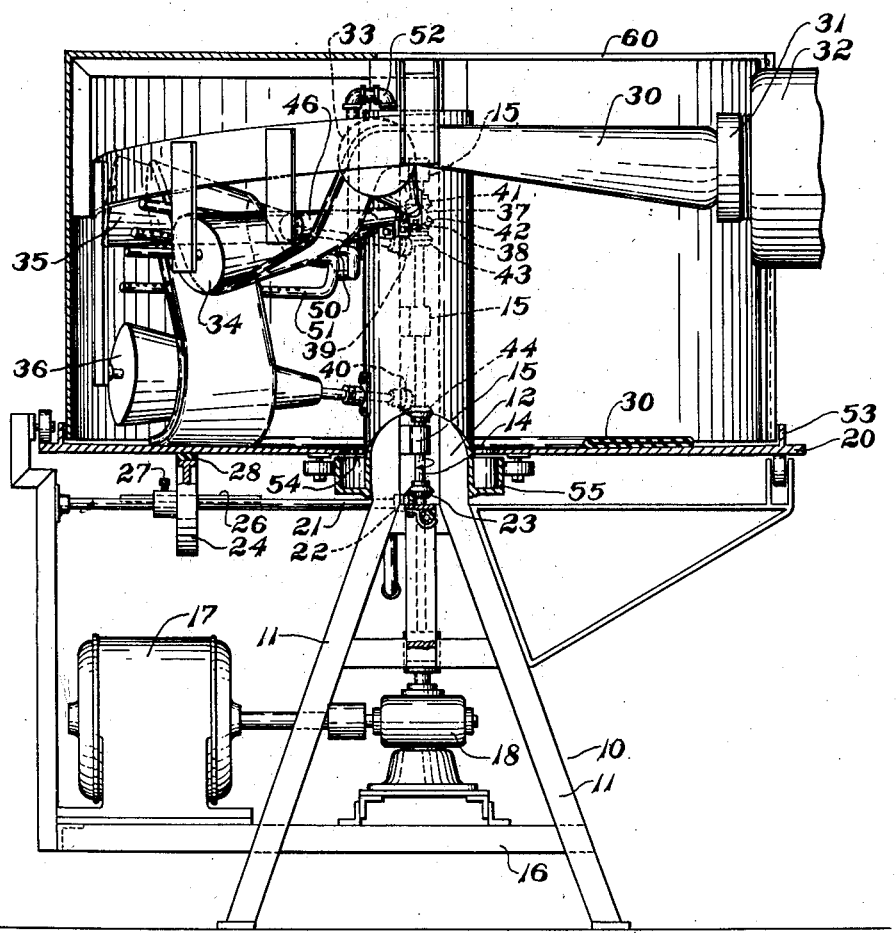
Fig. 1 is a side elevation, partly broken away and partly in section showing apparatus constructed in accordance with and embodying the invention.
Figure 2:
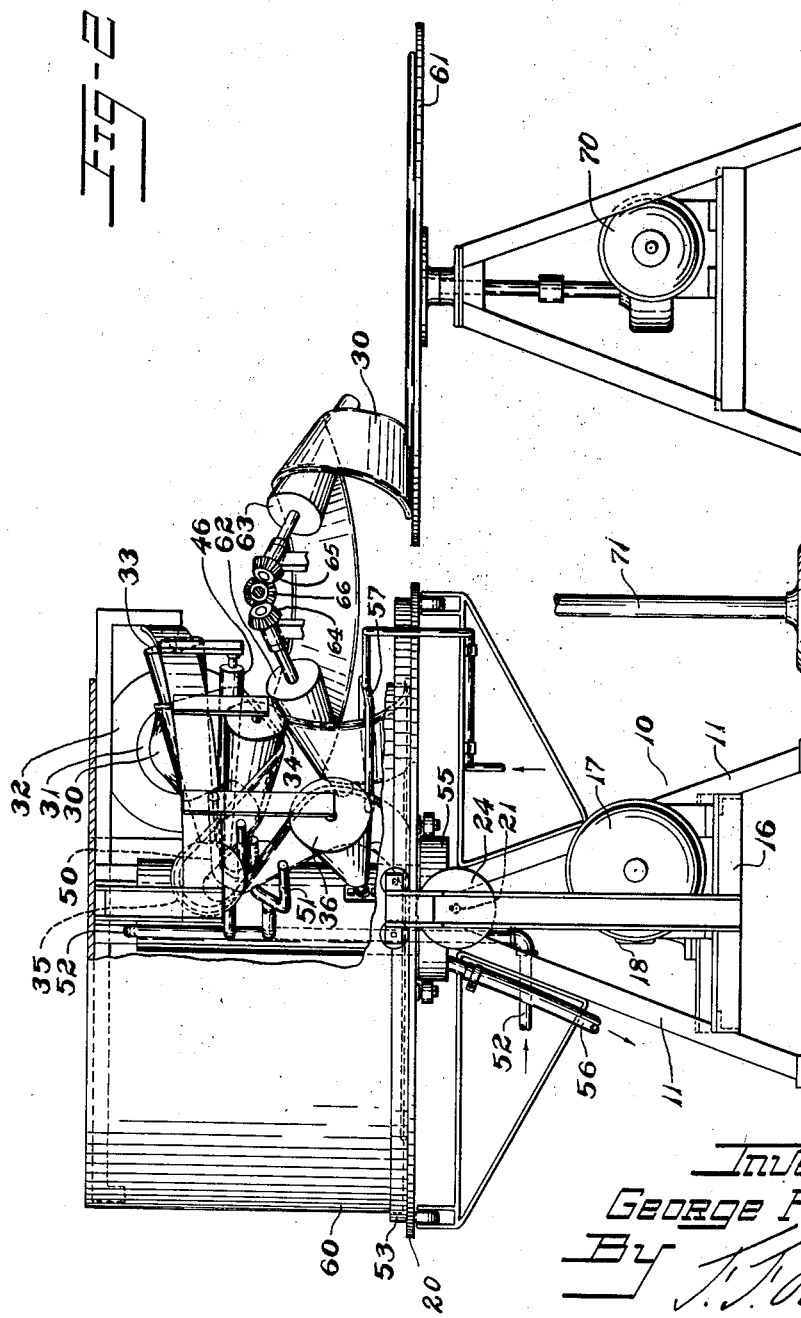
Fig. 2 is a front elevation thereof, parts being broken away.
Figure 3:
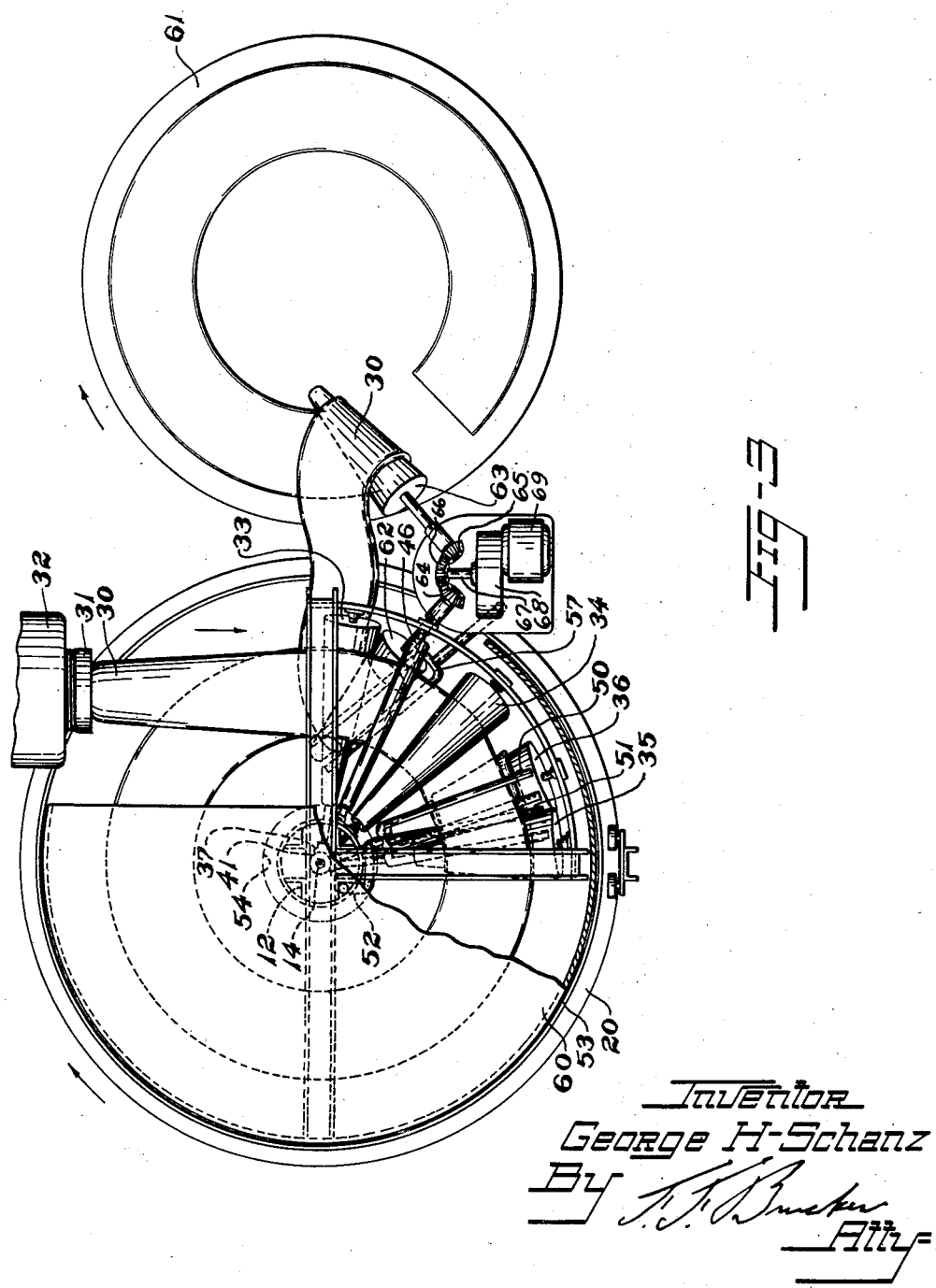
Fig. 3 is a plan view thereof.

Referring to the drawings, the numeral 10 designates a frame having angle iron legs 11 forming at their upper ends a hollow column 12 through which extends a vertically disposed shaft 14 journaled for rotation in bearings 15. A shelf 16 secured to legs 11 supports an electric motor 17 and a geared speed reducer 18 which drives the shaft 14 at the desired speed.

A rotatable table 20 is supported by the frame 10 for supporting the annularly formed material. For rotating the table, a shaft 21 extends radially of the table therebeneath and has a bevel gear 22 secured thereto which meshes with a bevel gear 23 secured to shaft 14. A friction drive wheel 24 slidably mounted on the shaft 21 and engages a feather-key 26 thereon for driving it. A set screw 27 provides for locking the drive wheel in any desired position along the shaft 21. The rim of the drive wheel has a facing 28 of rubber or other friction material for contacting and driving the table.

For forming the tubular material 30 progressively as it is delivered from the die 31 of an extruding machine 32, a series of conical driven rollers 33, 34, 35, 36 are arranged radially of the table 20 thereabove, each with its small end toward the center of the table and with their axes in non-parallel relation to each other. At least one of the rollers is driven and for this purpose the rollers are mounted on shafts having bevel gears 37, 38, 39, 40 respectively which may be positioned to mesh with bevel gears 41, 42, 43, 44 secured to shaft 14. These rollers are arranged so that the roller 33 which is the smallest in diameter and has the least taper is at the most elevated position and substantially at the elevation of the die 31. The roller 34 is at a lower position and is larger in diameter and of greater taper than the roller 33. The roller 35 is larger than roller 34 and of greater taper. It is arranged at a lower elevation than roller 33 but above roller 34. Roller 36 is the largest in diameter and taper and is located below the other rolls and near the table 20. The arrangement is such that the tubular material 30 is passed over roller 33 below roller 34, over roller 35 and under roller 36 in succession and then onto the table 20. As the material passes from roller to roller it is stretched progressively at its margin adjacent the larger ends of the rollers which by their increase in diameter travel at progressively increasing surface speeds. While it is preferred to drive all of the rolls, it has been found satisfactory to drive rollers 33, 35 and 36, permitting roller 34 to operate as an idler roller rotated by contact with the material. The bevel gears 41, 42, 43, 44 may be moved along shaft 14 into or out of mesh with the gears on the rollers to drive them as desired.

It has been found that a slight wrinkling of the material between rollers 33 and 34 may be avoided by use of an idler roller 46 contacting the upper surfaces of the material between rollers 33 and 34. The roller 46 is only slightly tapered and is placed so as to deflect the material slightly from a straight course between rollers 33 and 34.

Means are provided for cooling the tubular material as it is being formed and for this purpose a bifurcated spray pipe 50 is located with its spray branches above and below the material passing between rollers 34 and 35 and a similar spray pipe 51 is located with its spray branches above and below the material passing between the rollers 35 and 36. These pipes are connected to a cooling water line 52 extending upwardly through the column of the frame. The table 20 has an upstanding rim 53 and its center is open as at 54 so as to discharge into a catch basin 55 having a drain line 56. The arrangement is such that the material on the table 20 is additionally cooled by liquid from the spray pipes which collects on the table. The material may be progressively removed from the table 20 for cutting to length as hereinafter described, and an additional bifurcated pipe 57 is provided to dry the material as it leaves the table, its branches being perforated and disposed along opposite faces of the material. This pipe is connected to a compressed air supply (not shown). A housing 60 extends over and about the table and is supported by the column of the frame. It provides for enclosing the material being processed and confines the spray thereto. The housing has openings for receiving the die of the extruding machine and for permitting removal of material from the table.

Where the material is to be cut to short lengths, this may be done on the table 20 as the table rotates. For convenience, however, a second rotatable table 61 may be located near the table 20 and means such as the motor 70 provided for rotating it in the same direction as that of the table 20. Guide rollers 62, 63 may be mounted for rotation above table 20 and table 61 respectively so that they support and reverse a reach of material between the tables and direct it to the table 61 where it may be coiled or cut to length as desired. As the material has been cooled before leaving the table 20, the rollers 62, 63 are not employed to form the material but merely to guide the formed material and may be suspended for rotation in any desired manner, as from a stationary support 71. For driving the rollers 62, 63, gears 64, 65 are fixed thereto. These gears mesh with an intermediate gear 66 fixed to the shaft 67 of a speed reducer 68 driven by a motor 69. The arrangement is such that both rollers 62, 63 are driven in the same direction at a surface speed corresponding to that of the tables 20, 61.

In operation, the motor 17, which is of the variable speed type is adjusted so that the tubular material 30 between the die 31 and the roller 33 is free from slack and substantially free from stretch. The forming apparatus is adjusted so that the roller 33 is at about 90 degrees to the axis of the die 31 and about thirty inches therefrom. The rollers 33, 34, 35, 36 are wider than the flattened tubular stock and the apparatus is adjusted horizontally along the floor in a direction at right angles to the center line of the die 31 until the tube assumes the desired curvature on the table 20. As the material contacts the rollers at their larger diameters it assumes the least curvature and at their smaller ends it assumes the greatest or sharpest curvature. The material is led over and under the rolls as described and shown and accumulates on the rotating table where it may be cut into pieces of the desired lengths or the leading end may be led over driven rolls 62, 63 and coiled upon table 61.

By leading the material in a sinuous path about driven conical rollers of progressively increasing diameter and of progressively increasing taper, the material is formed progressively to the desired curvature while maintaining uniformity of wall and freedom from wrinkles or other irregularities. The progressive cooling of the material provides for shrinking of the short side of the annular strip while the long side is set in its slightly stretched condition. The compact nature of the apparatus provided by the arrangement of the conical rolls about an annular course consumes but small floor space and the apparatus is readily adjusted with relation to the extruder to regulate the curvature of the product.

The invention is especially useful in the manufacture of inner tubes for aircraft where tubes of very small internal diameter as compared to their cross-sectional dimensions are required.

Variations may be made without departing from the scope of the invention as it is defined by the following claims.

I claim:

1. Apparatus for progressively working a tube of plastic material in flattened form, said apparatus comprising a series of conical rollers arranged about an annular course with their smaller ends toward the center of the course, said rollers being positioned to contact opposite sides of the flattened tube of material during its progress about the course, means for driving at least one of said rollers to advance the material, and a table rotatable about the center of the course for receiving the annularly curved material.

2. Apparatus for progressively working a tube of plastic material in flattened form, said apparatus comprising a series of conical rollers arranged about an annular course with their smaller ends toward the center of the course, said rollers being positioned to contact opposite sides of the flattened tube of material during its progress about the course, means for driving at least one of said rollers to advance the material, a table rotatable about the center of the course for receiving the annularly curved material, and means for cooling the material.

3. Apparatus for progressively working a tube of plastic material in flattened form, said apparatus comprising a series of conical rollers arranged about an annular course with their smaller ends toward the center of the course, said rollers being positioned to contact opposite sides of the flattened tube of material during its progress about the course, means for driving at least one of said rollers to advance the material, a table rotatable about the center of the course for receiving the annularly curved material, said table having a marginal retaining wall and a drain, and means for applying a cooling fluid to the material.

4. Apparatus for progressively working a tube of plastic material in flattened form, said apparatus comprising a series of conical rollers arranged about an annular course with their smaller ends toward the center of the course, said rollers being positioned to contact opposite sides of the flattened tube of material during its progress about the course, means for driving at least one of said rollers to advance the material, a table rotatable about the center of the course for receiving the annularly curved material, a second rotatable table, means for rotating said second table in a direction opposite to the direction of rotation of the first table, and means for guiding the leading end of the material from said first table to said second table.

5. Apparatus for progressively working a tube of plastic material in flattened form, said apparatus comprising a series of conical rollers of progressively increasing diameter, said rollers being positioned to contact alternately opposite sides of the flattened tube, and means for driving at least one of said rollers.

6. Apparatus for progressively working a tube of plastic material in flattened form, said apparatus comprising a series of conical rollers of progressively increasing diameter, said rollers being positioned to contact alternately opposite sides of the flattened tube, and means for driving at least one of said rollers, said rollers being arranged with their larger ends at one margin of the flattened tube and their smaller ends at the opposite margin of the tube.

7. Apparatus for progressively working a tube of plastic material in flattened form, said apparatus comprising a series of conical rollers of progressively increasing taper, said rollers being positioned to contact alternately opposite sides of the flattened tube, and means for driving at least one of said rollers.

8. Apparatus for progressively working a tube of plastic material in flattened form, said apparatus comprising a series of conical rollers of progressively increasing diameter and taper, said rollers being positioned to contact alternately opposite sides of the flattened tube, and means for driving said rollers.

9. Apparatus for progressively working a tube of plastic material in flattened form, said apparatus comprising a series of conical rollers of progressively increasing diameter and taper, said rollers being positioned to contact alternately opposite sides of the flattened tube, and means for driving said rollers, said rollers being arranged about an annular course with their smaller ends toward the center of the course.

10. Apparatus for progressively working a tube of plastic material in flattened form, said apparatus comprising a series of conical rollers of progressively increasing diameter and taper, said rollers being positioned to contact alternately opposite sides of the flattened tube, means for driving said rollers, said rollers being arranged about an annular course with their smaller ends toward the center of the course, and means for cooling the tubular material as it is formed along the course.

11. Apparatus for progressively working a tube of plastic material in flattened form, said apparatus comprising means for advancing the tubular material, and a series of conical rollers of progressively increasing diameter arranged about an annular course with their smaller ends toward the center of the course, said rollers being positioned to contact opposite sides of the flattened tube of material during its progress about the course.

12. Apparatus for progressively working a tube of plastic material in flattened form, said apparatus comprising a table rotatable about a vertical axis, a set of conical rolls above said table, said rolls having their small ends directed toward the axis of said table, and means at the axis of the table for driving at least one of said rolls to advance the tube along an annular course into engagement with said table.

13. Apparatus for progressively working a tube of plastic material in flattened form, said apparatus comprising a table rotatable about a vertical axis, a set of conical rolls above said table for guiding the material to the table, said rolls having their small ends near the center of said table and with the axes of said rolls each at a different elevation, and means for driving at least one of said rolls to advance the material thereover.

14. Apparatus for progressively working a tube of plastic material in flattened form, said apparatus comprising a table rotatable about a vertical axis, a set of conical rollers above said table for guiding the material to the table, said rolls having their small ends near the center of the table with the axes of said rolls each radiating therefrom at a different elevation and each at a different angular relation to the axis of said table.

GEORGE H. SCHANZ.

REFERENCES CITED

The following references are of record in the file of this patent:

UNITED STATES PATENTS

| Number | Name | Date |
|---|---|---|
| 2,070,252 | Borner | Feb. 9, 1937 |
| 2,423,147 | Hinman | July 1, 1947 |